United States Patent [19]
Levine

[11] 3,910,923
[45] Oct. 7, 1975

[54] ISOINDOLO [7,1,2,-HIJ] QUINOLINES)

[75] Inventor: Seymour D. Levine, North Brunswick, N.J.

[73] Assignee: E. R. Squibb & Sons, Inc., Princeton, N.J.

[22] Filed: Nov. 19, 1973

[21] Appl. No.: 417,156

Related U.S. Application Data

[62] Division of Ser. No. 215,189, Jan. 3, 1972, Pat. No. 3,819,624.

[52] U.S. Cl. .......................................... 260/287 P
[51] Int. Cl.² ..................................... C07D 215/16
[58] Field of Search ............. 260/288, R, 247.5 GP, 260/287 R

[56] References Cited
UNITED STATES PATENTS
3,351,600  11/1967  Brack et al. .................... 260/288 R OTHER PUBLICATIONS
ACS News, Apr. 3, 1972, p. 18, from "Chemical and Engineering News."
Burger, "Medicinal Chemistry," 1963, p. 42, col. 1, par. 4, Interscience publishers.

Primary Examiner—Donald G. Daus
Assistant Examiner—David E. Wheeler
Attorney, Agent, or Firm—Lawrence S. Levinson; Merle J. Smith; Donald J. Barrack

[57] ABSTRACT

Isoindolo[7,1,2-hij]quinolines are provided having the structure

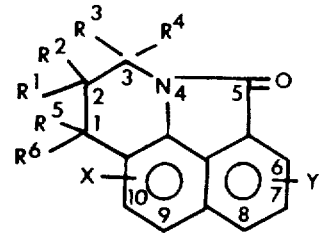

wherein $R^5$ can be hydroxyl, halogen, substituted amino, alkoxy, acyloxy, aroyloxy, substituted amido, and amino-subsituted amido; and $R^6$ is hydrogen; and $R^5$ and $R^6$ can be taken together to form $=O$; X, Y, $R^1$, $R^2$, $R^3$ and $R^4$ are as defined below; and which are anit-inflammatory agents, central nervous system depressants, inhibitors of cyclic AMP phosphodiesterase and sun-screening agents.

7 Claims, No Drawings

ISOINDOLO [7,1,2,-HIJ] QUINOLINES

This is a divisional application of U.S. Pat. application Ser. No. 215,189, filed Jan. 3, 1972, now U.S. Pat. 3,819,624, issued June 25, 1974.

This invention relates to isoindolo[7,1,2-hij] quinolines having the structure

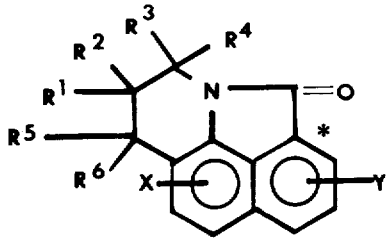

wherein X or Y can be hydrogen, halogen, nitro, lower alkyl, lower alkoxy, aryl or substituted amino and at least one of X and Y is hydrogen; $R^1$, $R^2$, $R^3$ and $R^4$ are the same or different and can be hydrogen or lower alkyl; $R^5$ is hydroxyl, halogen, lower alkoxy, acyloxy, aroyloxy, substituted amino

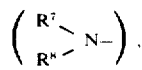

substituted amido and aminosubstituted amido; $R^6$ is hydrogen and $R^5$ and $R^6$ can be taken together to form =O; and acid-addition salts thereof where applicable.

$R^7$ and $R^8$ may be the same or different and represent hydrogen, lower alkyl, aryl and alkenyl. Furthermore, $R^7$ and $R^8$ can be taken together with N to form a heterocyclic ring.

The term "lower alkyl" as employed herein includes both straight and branched chain radicals of up to and including eight carbon atoms, for instance, methyl, ethyl, propyl, isopropyl, butyl, s-butyl, t-butyl, pentyl, hexyl, isohexyl, heptyl, 4,4-dimethylpentyl, octyl, 2,2,4-tri-methylpentyl and the like. The lower alkyl group can include substituents such as aryl, halo, hydroxyl, alkoxy, amino or substituted amino.

The term "halogen" includes F, Cl, Br or I.

The term "aryl" as employed herein includes monocyclic carbocyclic aryl radicals, for instance, phenyl and substituted phenyl radicals, such as lower alkyl- or alkoxyphenyl (e.g., o-, m-, or p-tolyl, ethylphenyl, butylphenyl and the like), di(lower alkyl)phenyl (e.g., 2,4-dimethylphenyl, 3,5-diethylphenyl, and the like, and corresponding alkoxy compounds), halophenyl (e.g., chlorophenyl, bromophenyl, iodophenyl and fluorophenyl), o, m- or p-nitrophenyl, dinitrophenyl (e.g., 3,5-dinitrophenyl, 2,6-dinitrophenyl, and the like), and trinitrophenyl (e.g., picryl), and aminophenyl, such as p-dimethylaminophenyl.

The "acyl" or "aryl" portion of the "acyloxy" or aroyloxy group, respectively, is derived from a hydrocarbon carboxylic acid of less than 12 carbon atoms, which may be exemplified by the lower alkanoic acids (e.g., formic, acetic, propionic, butyric, valeric, trimethyl acetic and caproic acids), the lower alkenoic acids (e.g., acrylic, methacrylic, crotonic, 3-butenoic and senecioic acids), the monocyclic aryl-carboxylic acids (e.g., benzoic and toluic acids), the monocyclic aryllower alkanoic acids [e.g., phenacetic, β-phenylpropionic, α-phenylbutyric, and 5-(p-methylphenyl)pentanoic acids], the cycloalkyl carboxylic acids (e.g., cyclobutane carboxylic acid, cyclopentane carboxylic acid and cyclohexane carboxylic acid), the cycloalkenyl carboxylic acids (e.g., 2-cyclobutene carboxylic acid and 3-cyclopentene carboxylic acid), the cyclopentene carboxylic acid), the cycloalkyl and cycloalkenyllower alkanoic acids [e.g., cyclohexaneacetic, α-cyclopentanebutyric, 2-cyclopenteneacetic and 3-(3-cyclohexene) pentenoic acids], and the like.

The term "alkenyl" includes mono-unsaturated straight chain or branched chain radicals of less than eight carbons corresponding to "lower alkyl" as defined above.

Examples of $NR^7R^8$ amino groups include mono- or dilower alkyl-, arylalkyl-, lower alkylaryl-, alkenyl- or arylamino wherein lower alkyl and aryl are as defined herein, such as methylamino, ethylamino, isopropylamino, heptylamino, dimethylamino, diethylamino, ethylmethylamino, butylmethylamino, ethyl i-propylamino, allylamino, anilino, benzylamino, diphenylamino, naphthylamino, of N-methyl-N-phenylamino and the like.

$NR^7R^8$ can be taken together to form a heterocyclic radical having the formula

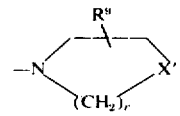

in which X' represents $NR^{10}$, O, S or $CH_2$, r represents 1, 2 or 3; $R^{10}$ represents hydrogen, lower alkyl, hydroxy-lower alkyl, lower alkanoyloxy-lower alkyl, hydroxy-lower alkoxy-lower alkyl, di(lower alkyl)aminolower alkoxy-lower alkyl, lower alkylamino-lower alkyl, di-lower alkyl amino-lower alkyl, amino-lower alkyl; and $R^9$ represents any of the $R^{10}$ groups. These may be exemplified by piperidinyl; (lower alkyl)piperidinyl [e.g., 2-, 3- or 4-(lower alkyl)piperidinyl]; (lower alkoxy)piperidinyl; pyrrolidinyl; (lower alkyl)-pyrrolidinyl; (lower alkoxy)pyrrolidinyl; piperazinyl; (lower alkyl)piperazinyl (e.g., $N^4$-methylpiperazinyl); di(lower alkyl)piperazinyl; (lower alkoxy)piperazinyl; (hydroxylower alkyl)piperazinyl [e.g., $N^4$-(2-hydroxyethyl)piperazinyl]; (lower alkanoyloxyalkyl)piperazinyl [e.g., $N^4$-(2-acetoxyethyl)-piperazinyl]; (hydroxylower alkoxy-lower alkyl)piperazinyl [e.g., $N^4$-[2-(2-hydroxyethoxy)ethyl]piperazinyl]; di-(lower alkyl)amino-(lower alkoxy-lower alkyl)piperazinyl [e.g., $N^4$-[2-(2-dimethylaminoethoxy)ethyl]piperazinyl]; homopiperazinyl; amino(lower alkyl)piperidinyl [e.g., 3-(aminomethyl)piperidinyl], lower alkylamino (lower alkyl)piperdinyl[piperidinyl[e.g., 2-[(methylamino)ethyl]piperidinyl], di-lower alkylamino(lower alkyl) piperidinyl[e.g., 4[(dimethylamino)methyl)]piperidinyl].

The term "amido" as employed herein includes radicals of the structure

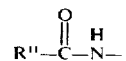

wherein $R^{11}$ can be lower alkyl, alkenyl, or aryl, substituted alkyl or substituted aryl, substituted with halogen, hydroxyl, alkoxy, amino or mono- or disubstituted amino or a monocyclic heterocycle such as pyridyl, furyl, thiazolyl, thienyl or pyrryl. The disubstituted amino substituent of the alkyl may also form a 5 to 7 membered heterocycle which may have up to two hetero atoms, such as morpholino, pyrrolidino or piperidino.

The term "amino-substituted amido" includes radicals of the structure

wherein $n$ is 1 to 12 and $(CH_2)_n$ represent alkylene chains, that is, bivalent saturated straight or branched aliphatic groups, containing 1 to 12 carbons, corresponding to the above-mentioned lower alkyl groups and which may include lower alkyl and/or aryl side chains. Examples of such alkylene groups include methylene, ethylene, 1-methylethylene, 2-methylethylene, tetramethylene, propylene, trimethylene, hexamethylene, octamethylene, decamethylene, dodecamethylene, 3-methyldodecamethylene, dimethylethylene, 1-phenylethylene and the like.

The salts of the compounds of this invention include the acid-addition salts, particularly the non-toxic acid-addition salts. Acids useful for preparing the acid-addition salts, include inter alia, inorganic acids, such as the hydrohalic acids (e.g., hydrochloric and hydrobromic acid), sulfuric acid, nitric acid and phosphoric acid, and organic acids, such as oxalic, maleic, fumaric, tartaric, citric, pamoic, acetic, and succinic acid.

Compounds of formula I wherein $R^5$ and $R^6$ are taken together to form =O that is

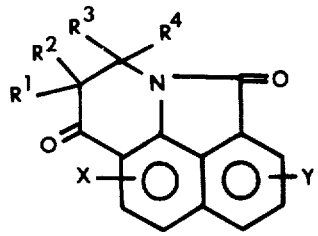

can be prepared by reacting a naphthostyril derivative of the structure

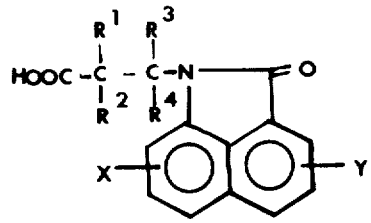

with a cyclizing agent, such as polyphosphoric acid, in large excess, at a temperature within the range of from about 50 to about 200°C and preferably from about 70 to about 130°C.

Compounds of formula I wherein $R^5$ is hydroxyl and $R^6$ is hydrogen, that is

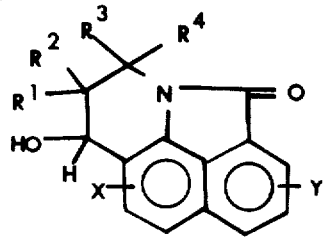

can be prepared by reducing compound V above by reacting it with an alkali metal borohydride, such as $NaBH_4$, $KBH_4$ or $LiBH_4$.

Compounds of formula I wherein $R^5$ is halogen and $R^6$ is hydrogen, that is

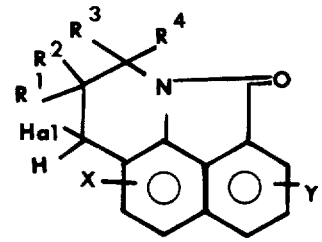

can be prepared by reacting compound VII above with a halogenating agent such as thionyl chloride, thionyl bromide, phosphorus trichloride or phosphorus tribromide.

Compounds of formula I wherein $R^5$ is substituted amino ($R^7R^8N-$) and $R^6$ is hydrogen, that is

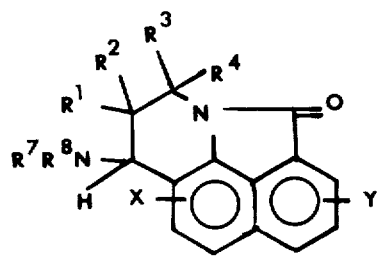

can be prepared by reacting compound VIII above with an amine of the structure

in an aprotic solvent, such as dioxane, chloroform, or acetone, at a temperature within the range of from about 50° to about 100°C, depending upon the solvent employed, and preferably at reflux temperature.

Compounds of formula I wherein $R^5$ is lower alkoxy and $R^6$ is hydrogen, that is

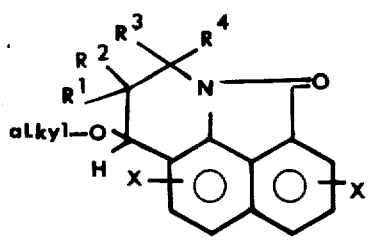

can be prepared by refluxing compound VIII above with a lower alkanol.

Compounds of formula I wherein $R^5$ is substituted amido, that is

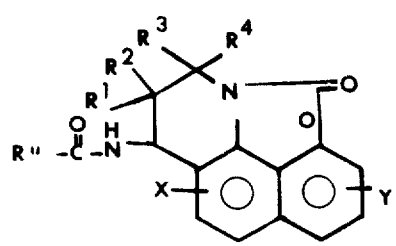

can be prepared by reacting compound VII above with a nitrile of the structure
XIII

R¹¹CN in the presence of an acid, in a Ritter reaction wherein R¹¹ is as defined hereinbefore.

Some specific examples of nitriles which are useful in the present invention are the following:

```
HCN
CH₃CN
CH₃CH₂CN
CH₂=CHCN
HOCH₂CH₂CN
ClCH₂CH₂CN
CH₃CH₂
        >NCH₂CH₂CN
CH₃CH₂
```

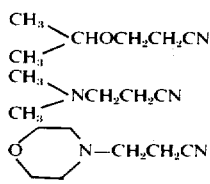

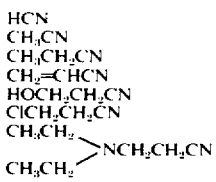 

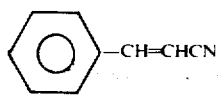

 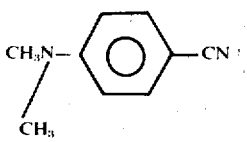

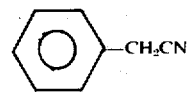 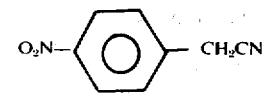

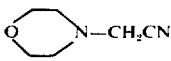 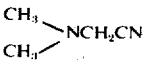

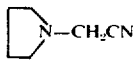 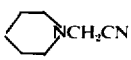

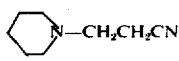 

The reaction between the nitrile and compound VII conveniently takes place at about room temperature and at about atmospheric pressure. Operable temperatures, however, may vary from about −20°C to about 80°C, preferably from about 0°C to about 60°C and most preferably from about 25°C to about 50°C. Operable pressures may vary from about 0.2 atmosphere to about 5 atmospheres, preferably from about 0.5 atmosphere to about 2 atmospheres, and most preferably at about atmospheric pressure. The reaction time may vary from a few minutes to several days. Generally, reaction times will be from about 10 minutes to about 100 hours. Lower temperatures usually require longer reaction time.

While an excess of the nitrile is permissible, the nitrile and compound VII may also be employed in stoichiometric quantities, or with a slight excess of nitrile.

In the case of nitriles which are solid at room temperature, the reaction is preferably carried out in the presence of polar and non-polar solvents such as, for example, glacial acetic acid, acetic anhydride, di-n-butyl ether, chloroform, carbon tetrachloride, hexane and nitrobenzene.

A variety of acids may be used to carry out the reaction between compound VII and the nitrile. Examples of suitable acids are sulfuric, perchloric, phosphoric, polyphosphoric, formic, substituted sulfonic acids and boron trifluoride. In general, concentrated sulfuric acid is preferred.

Compounds of formula I wherein R⁵ is

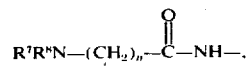

that is

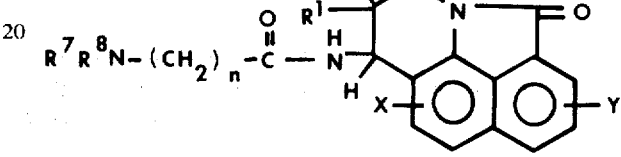

wherein n is 1 to 4, can be prepared by reacting compound XII wherein R¹¹ is (CH₂)ₙHal that is

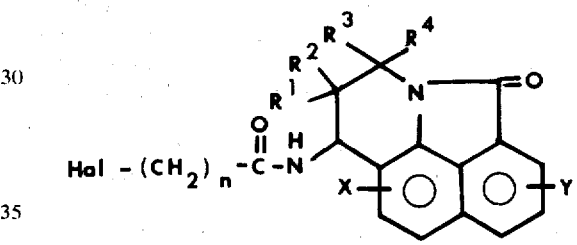

with an amine of the structure X.

Compounds of formula I wherein R⁵ is acyloxy or aroyloxy and R⁶ is H, that is

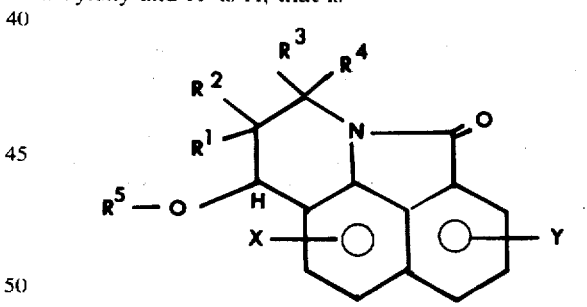

can be prepared by reacting compound VII with a carboxylic acid containing up to twelve carbons or an acid anhydride thereof or acyl or aroyl halide. Examples of such acids are set out hereinbefore.

Examples of starting naphthostyril derivatives which can be employed herein include, but are not limited to, the following set out in Table A below:

TABLE A

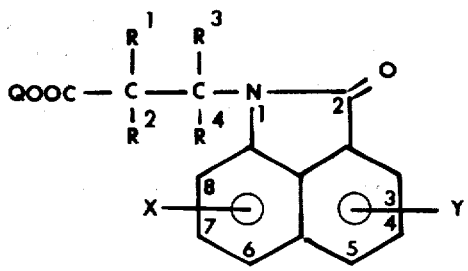

TABLE A—Continued

| | $R^1$ | $R^2$ | $R^3$ | $R^4$ | X (position) | Y (position) | Q |
|---|---|---|---|---|---|---|---|
| 1. | H | H | H | H | H | Br (4) | $C_2H_5$ |
| 2. | H | $CH_3$ | H | H | H | F (4) | $CH_3$ |
| 3. | $CH_3$ | $C_2H_5$ | H | H | H | I (4) | H |
| 4. | $CH_3$ | $CH_3$ | $CH_3$ | $CH_3$ | H | $OCH_3$ (4) | $C_3H_7$ |
| 5. | $C_2H_5$ | H | H | H | H | $N(CH_3)_2$ (4) | H |
| 6. | $C_3H_7$ | H | $C_3H_7$ | H | H | Br (5) | $C_4H_9$ |
| 7. | H | $C_4H_9$ | H | $C_4H_9$ | H | F (5) | H |
| 8. | H | H | $CH_3$ | $CH_3$ | H | I (5) | H |
| 9. | $C_5H_{11}$ | $C_5H_{11}$ | H | H | H | $OCH_3$ (5) | $CH_3$ |
| 10. | $C_6H_{13}$ | H | H | H | Br (6) | H | $C_5H_{11}$ |
| 11. | H | H | H | H | F (6) | H | $C_6H_{13}$ |
| 12. | $C_2H_5$ | H | $C_2H_5$ | H | I (6) | H | H |
| 13. | $CH_3$ | H | H | $CH_3$ | Cl (6) | H | H |
| 14. | $C_3H_7$ | $CH_3$ | $CH_3$ | $C_3H_7$ | $OCH_3$ (6) | H | H |
| 15. | $C_6H_{13}$ | $CH_3$ | H | H | $C_6H_5$ (6) | H | $C_2H_5$ |
| 16. | H | $CH_3$ | $C_4H_9$ | H | F (8) | H | H |
| 17. | H | $CH_3$ | H | H | $C_6H_5$ (8) | H | $CH_3$ |
| 18. | $C_2H_5$ | $C_2H_5$ | H | $CH_3$ | $CH_3$ (8) | H | H |
| 19. | H | H | H | H | $C_2H_5$ (8) | H | $C_3H_7$ |

Other examples of naphthostyril derivative starting materials are set out in copending U.S. application Ser. No. 185,820, filed Oct. 1, 1971 entitled *Naphthostyril Derivatives*, and now abandoned.

Examples of other starting reactants such as $R^7R^8NH$, are set out in the working Examples.

The compounds of this invention possess central nervous system modifying activity, particularly as depressants and are therefore useful as tranquilizers. They may be administered orally or parenterally in the form of tablets, capsules, elixirs, injectables or the like by incorporating the appropriate dosage of the compound with carriers according to accepted pharmaceutical practice.

The dosage for various mammalian species would be from 25 to 250 mg. administered orally or parenterally once to several times daily, dependent upon the individual requirements of the recipient.

In addition, the compounds of the invention have been found to inhibit cyclic AMP phosphodiesterase, thereby providing an increase in the intracellular concentration of adenosine-3′,5′-cyclic monophosphate. The administration of about 10 to 900 mg/kg/day, preferably about 20 to 250 mg/kg, of the compounds of the invention in single or two to four divided doses in conventional oral or parenteral dosage forms such as those described above may be used to alleviate the symptoms of asthma.

Further, the compounds of the invention are useful as sunscreening agents.

The compounds of this invention are also useful as anti-inflammatory agents in warm blooded animals in a manner similar to indomethacin. They may be used to decrease joint swelling tenderness, pain and stiffness, in mammalian species, e.g., in conditions such as rheumatoid arthritis. A compound of formula I or a physiologically acceptable salt (when applicable) of the character described above may be compounded according to accepted pharmaceutical practice in oral dosage forms such as tablets, capsules, elixirs or powders for administration of about 100 mg to 2 gm per day, preferably 100 mg to 1 gm per day in two to four divided doses.

The following examples illustrate the present invention without, however, limiting the same thereto. All temperatures are expressed in °C.

EXAMPLE 1

2,3-Dihydroisoindolo[7,1,2-hij]quinoline-1,5-dione

A mixture of 260 mg of 1,2-dihydro-2-oxobenz[cd]-indole-1-propionic acid in 12.5 ml of polyphosphoric acid is stirred and heated at 100° for 1 hour. The mixture is poured into water, stirred and extracted with chloroform. The chloroform extracts are washed with saturated sodium bicarbonate solution, 8% salt solution, dried and evaporated. Plate chromatography of the residue on neutral alumina using chloroform as the developing solvent gives a major yellow band which is eluted with ethyl acetate. Evaporation gives a residue which is crystallized from chloroform-isopropyl ether to give 117 mg of the title compound, m.p. 187°–188°. Recrystallization from the same solvents gives the analytical sample, m.p. 187.5°–188.5°.

Anal. Calcd. for $C_{14}H_9NO_2$: C, 75.32; H, 4.06; N, 6.28. Found: C, 75.21; H, 4.32; N, 6.14.

EXAMPLE 2

9-Chloro-2,3-dihydroisoindolo[7,1,2-hij]quinoline-1,5-dione

Following the procedure of Example 1, but employing 6-chloro-1,2-dihydro-2-oxobenz[cd]indole-1-propionic acid as the starting material, there is obtained the title compound, m.p. 255.5°–256.5°.

Anal. Calcd. for $C_{14}H_8ClNO_2$: C,65.25; H,3.13; N,5.44; Cl,13.75. Found: C,65.27; H,3.40; N,5.17; Cl,14.00.

EXAMPLE 3

2,3-Dihydro-1-hydroxyisoindolo[7,1,2-hij]quinolin-5(1H)-one

A solution of 117 mg of 2,3-dihydroixoindolo[7,1,2-hij]quinoline-1,5-dione in 5 ml of dioxane and 5 ml of methanol is treated with 30 mg of sodium borohydride and stirred at room temperature for 1 hour. The mixture is concentrated, diluted with water and extracted with chloroform. The extracts are washed with 8% salt solution, dried and evaporated. Plate chromatography of the residue on silica gel using chloroform-ethyl acetate as the developing solvent gives a major yellow band which is eluted with ethyl acetate. Evaporation gives a residue which is crystallized from chloroformisopropyl ether to give 90 mg of the title compound, m.p. 162°–163.5°. Recrystallization from the same solvents gives the analytical sample, m.p. 163°–164°.

Anal. Calc'd. for $C_{14}H_{11}NO_2$: C,74.65; H,4.92; N,6.22. Found: C,74.55; H,5.18; N,6.21.

EXAMPLE 4

9-Chloro-2,3-dihydro-1-hydroxyisoindolo[7,1,2-hij]quinoline-5(1H)-one

Following the procedure of Example 3, but employing 9-chloro-2,3-dihydroisoindolo[7,1,2-hij]quinoline-1,5-dione as the starting material, there is obtained the title compound, m.p. 240.5°–241.5°.

Anal. Calcd. for $C_{14}H_{10}ClNO_2$: C, 64.75; H,3.88; N,5.40; Cl,13.65. Found: C,64.54; H,4.07; N,5.19; Cl,13.88.

EXAMPLE 5

1-Acetoxy-2,3-dihydroisoindolo[7,1,2-hij]quinolin-5(1H)-one

A mixture of 200 mg of 2,3-dihydro-1-hydroxyisoindolo[7,1,2-hij]quinolin-5(1H)-one in 1.5 ml of pyridine and 1.5 ml of acetic anhydride is allowed to react overnight. The mixture is poured into ice-water and extracted with chloroform. The extracts are washed with 2N HCl, and 8% salt solution, dried and evaporated. The residue is crystallized from etherhexane to give 200 mg of the title compound, m.p. 105°–106°. Recrystallization from the same solvents gives the analytical sample, 105°–106°.

Anal. Cald'd. for $C_{16}H_{13}NO_2$: C,71.90; H,4.90; N,5.13. Found: C,71.61; H,5.08; N,5.24.

EXAMPLE 6

1-Chloro-2,3-dihydroisoindolo[7,1,2-hij]quinolin-5(1H)-one

A mixture of 1.0 g of 2,3-dihydro-1-hydroxyisoindolo[7,1,2-hij]quinolin-5(1H)-one in 20 ml of benzene is treated with 1.4 ml of thionyl chloride and stirred overnight. The mixture is diluted with water and the benzene layer separated. The benzene fraction is washed with water, 8% salt solution, dried and evaporated to give the title compound.

EXAMPLE 7

1-Ethoxy-2,3-dihydroisoindolo[7,1,2-hij]quinolin-5(1H)-one

A mixture of 1.66 g of 1-chloro-2,3-dihydroisoindolo[7,1,2-hij]quinolin-5(1H)-one in 50 ml of ethanol containing 1 ml of triethylamine is refluxed for 2.5 hours. The solvents are evaporated, and the residue treated with water and extracted with chloroform. The chloroform extracts are washed with 8% salt solution, dried and evaporated. The residue is crystallized from isopropyl ether to provide 1.38 g of the title compound, m.p. 95.5°–96.5° Recrystallization from isopropyl ether gives the analytical sample, 97°–98°.

Anal. Cald'd. for $C_{16}H_{15}NO_2$: C,75.87; H,5.97; N,5.53. Found: C,75.95; H,5.53; N,5.31.

EXAMPLE 8

2,3-Dihydro-1-morpholinoisoindolo[7,1,2-hij]quinolin-5(1H)-one

A mixture of 1.66 g of 1-chloro-2,3-dihydroisoindolo[7,1,2-hij]quinolin-5(1H)-one in 5 ml of morpholine and 25 ml of dioxane is refluxed overnight. The mixture is evaporated, treated with 2N HCl and extracted with chloroform. The acid solution is made alkaline with sodium hydroxide and extracted with chloroform. The chloroform extracts are washed with 8% salt solution, dried and evaporated. The residue is crystallized from chloroformisopropyl ether to give 1.34 g of the title compound, m.p. 172°–173°.

Anal. Calcd. for $C_{18}H_{18}N_2O_2$: C,73.45; H,6.16; N,9.52. Found: C,73.21; H,6.07; N,9.49.

EXAMPLE 9

2,3-Dihydro-1-pyrrolidinoisoindolo[7,1,2-hij]quinolin5(1H)-one, hydrochloride

Following the procedure of Example 8, but employing pyrrolidine as the amine, and converting the product to the hydrochloride salt, there is obtained the title compound, m.p. 292°–293°d.

Anal. Calc'd. for $C_{18}H_{19}ClN_2O$: C,68.68; H,6.08; N,8.90; Cl,11.26. Found: C,68.52; H,6.31; N,8.65; Cl,11.52.

EXAMPLE 10

1-(Dimethylamino)-2,3-dihydroisoindolo[7,1,2-hij]quinolin-5(1H)-one, hydrochloride Following the procedure of Example 9, but employing diethylamine as the amine, there is obtained the title compound, m.p. 231.5°–232.5°.

Anal. Cald'd. for $C_{18}H_{21}ClN_2O$: C,68.24; H,6.68; N,8.85; Cl,11.19. Found: C,67.90; H,6.74; N,9.15; (Cl, 11.23.

EXAMPLE 11

1,9-Dichloro-2,3-dihydroisoindolo[7,1,2-hij]quinolin5(1H)-one

A solution of 500 mg of 2,3-dihydro-1-hydroxyisoindolo[7,1,2-hij]quinolin-5(1H)-one in 5 ml of acetic acid is cooled in an ice-bath and treated with 0.25 ml of sulfuryl chloride. After 30 minutes at room temperature, an additional 0.25 ml of sulfuryl chloride is added and the mixture is stirred for 1.5 hour. The mixture is diluted with water and extracted with chloroform. The chloroform extracts are washed with 8% salt solution, dried and evaporated. Plate chromatography of the residue on silica gel using chloroform as the developing solvent gives a major yellow band which is eluted with ethyl acetate. Evaporation gives a residue which is crystallized from acetone-petroleum ether to afford 90 mg of the title compound, m.p. 127°–129°. Recrystallization from the same solvents provides the analytical sample, m.p. 128°–129°.

Anal. Cald'd. for $C_{14}H_9Cl_2NO$: C,60.47; H,3.23; N,5.04; Cl,25.50 Found: C,60.77; H,3.51; N,4.98; Cl,25.62.

EXAMPLE 12

9-Chloro-2,3-dihydro-1-pyrrolidinoisoindolo[7,1,2-hij]-quinolin-5(1H)-one, hydrochloride A mixture of 3.1 g of 1,9-dichloro-2,3-dihydroisoindolo[7,1,2-hij]quinolin-5(1H)-one in 50 ml of dioxane and 10 ml of pyrrolidine is refluxed overnight and evaporated. The residue is treated with 2N sodium hydroxide solution and extracted with chloroform. The chloroform extracts are washed with 8% salt solution, treated with charcoal, filtered and dried. The free base is dissolved in dimethoxyethane treated with methanolic HCl and the solid collected by filtration to afford 1.53 g of the title compound, m.p. 308°–309°d. Recrystallization from ethanol provides the analytical sample, m.p. 312°–314°d.

Anal. Calc'd. for $C_{18}H_{18}Cl_2N_2O$: C,61.901 H,5.19; N,8.02; Cl,20.34. Found: C,62.18; H,5.36; N,7.87; Cl,20.54.

EXAMPLE 13

9-Chloro-2,3-dihydro-1-morpholinoisoindolo[7,1,2-hij]quinolin-5(1H)-one, hydrochloride Following the procedure of Example 12, but employing morpholine as the base, there is obtained the title compound, m.p. 277°–279°d, Anal. Calc'd. for $C_{18}H_{18}Cl_2N_2O_2$: C,59.18; H,4.97; N,7.66; Cl,19.14. Found: C,59.01; H,5.21; N,7.37; Cl,19.25.

EXAMPLE 14

1-Acrylamido-2,3-dihydroisoindolo[7,1,2-hij]quinolin-5(1H)-one

An ice-bath cooled suspension of 500 mg of 2,3-dihydro-1-hydroxyisoindolo[7,1,2-hij]quinolin-5(1H)-one in 5 ml of acrylonitrile is treated dropwise with 1.5 ml of concentrated sulfuric acid. The reaction mixture is stirred at room temperature for 2.5 hours, diluted with water and extracted with chloroform. The chloroform extracts are washed with 8% salt solution, dried and evaporated. Crystallization from chloroform gives 442 mg of the title compound, m.p. 234°–235°. Plate chromatography of this material on silica gel using chloroform-ethyl acetate (1:1) as the developing solvent gives a major yellow band, which is eluted with ethyl acetate. Evaporation and crystallization of the residue from chloroform gives the analytical sample, m.p. 237°–238°.

Anal. Calc'd. for $C_{17}H_{14}N_2O_2$: C,73.36; H,5.07; N,10.07. Found: C,73.31; H,4.98; N,10.03.

EXAMPLE 15

1-Acetamido-2,3-dihydroisoindolo[7,1,2-hij]quinolin-5(1H)-one

Following the procedure of Example 14, but employing acetonitrile, there is obtained the title compound, m.p. 253°–254°.

Anal. Calc'd. for $C_{16}H_{14}N_2O_2$: C,72.16; H,5.30; N,10.52. Found: C,71.89; H,5.58; N,10.43.

EXAMPLE 16

1-Benzamido-2,3-dihydroisoindolo[7,1,2-hij]quinolin-5(1H)-one

Following the procedure of Example 14, but employing benzonitrile, there is obtained the title compound, m.p. 261.5°–262.5°.

Anal. Calc'd. for $C_{21}H_{16}N_2O_2$: C,76.81; H,4.91; N,8.53. Found: C,76.76; H,4.95; N,8.46.

EXAMPLE 17

1-(3-Bromopropionamido)-2,3-dihydroisoindolo[7,1,2-hij]-quinolin-5(1H)-one

Following the procedure of Example 14, but employing 3-bromopropionitrile, there is obtained the title compound, m.p. 219°–219.5°.

Anal. Calcd. for $C_{17}H_{15}BrN_2O_2$: C,56.85; H,4.21; N,7.80; Br,22.25. Found: C,57.10; H,4.34; N,7.73; Br,22.45.

EXAMPLE 18

2,3-Dihydro-1-(3-morpholinopropionamido)-isoindolo[7,1,2-hij]-quinolin-5(1H)-one A solution of 650 mg of 1-(3-bromopropionamido)-2,3-dihydroisoindolo[7,1,2-hij]quinolin-5(1H)-one in 15 ml of ethanol and 1.3 ml of morpholine is refluxed for 2 hours. The mixture is concentrated and the solid collected by filtration to give 458 mg of the title compound, m.p. 200°–204°. Recrystallization from chloroform-isopropyl ether gives the analytical sample, m.p. 201°–202°.

Anal. Calc'd. for $C_{21}H_{23}N_3O_3$: C,69.02; H,6.34; N,11.50. Found: C,69.22; H,6.48; N,11.66.

EXAMPLE 19

2,3-Dihydro-1-[3-(1-pyrrolidinyl)propionamido]isoindolo[7,1,2-hij]quinolin-5(1H)-one Following the procedure of Example 18, but employing pyrrolidine as the amine, there is obtained the title compound, m.p. 214°–215°.

Anal. Calc'd. for $C_{21}H_{23}N_3O_2$: C,72.18; H,6.63; N,12.03. Found: C,72.34; H,6.88; N,12.07.

EXAMPLE 20

1-[3-(Diethylamino)propionamido]-2,3-dihydroisoindolo[7,1,2-hij]-quinolin-5(1H)-one, hydrochloride Following the procedure of Example 18, but employing diethylamine as the amine and converting the product to its hydrochloride salt, there is obtained the title compound, m.p. 238°–239°.

Anal. Calc'd. for $C_{21}H_{26}ClN_3O_2$: C,65.08; H,6.75; N,10.83; Cl,9.14. Found: C,64.86; H,7.02; N,11.08; Cl,9.08.

EXAMPLES 21 to 30

Following the procedure of Example 1, but employing the naphthostyril derivative shown in column 1 of Table I in place of 1,2-dihydro-2-oxobenz-[cd]-indole-1-propionic acid, the product shown in column 2 is obtained.

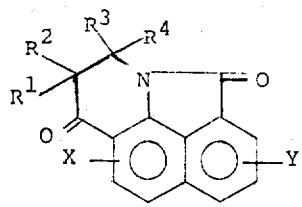

TABLE I

Column 1

QOOC-C(R¹)(R²)-C(R³)(R⁴)-N₁—C₂=O (fused to naphthalene with X at 6/7/8 positions and Y at 3/4/5 positions)

| Example No. | Q | R¹ | R² | R³ | R⁴ | X | Y |
|---|---|---|---|---|---|---|---|
| 21 | $CH_3$ | $CH_3$ | H | H | H | H | H |
| 22 | H | $C_2H_5$ | H | H | $C_2H_5$ | 6—Br | H |
| 23 | $C_3H_7$ | $CH_3$ | $CH_3$ | $CH_3$ | $CH_3$ | H | 4—$OCH_3$ |
| 24 | $C_4H_9$ | $C_3H_7$ | $CH_3$ | $C_3H_7$ | $CH_3$ | 6—$C_6H_5$— | H |
| 25 | H | H | H | H | $C_4H_9$ | H | 4—$N(CH_3)_2$ |
| 26 | $C_5H_{11}$ | H | H | H | H | H | 5—$OCH_3$ |
| 27 | $CH_3$ | $C_2H_5$ | $CH_3$ | $C_2H_5$ | $CH_3$ | H | 4—Br |
| 28 | H | H | H | H | $CH_3$ | H | 5—F |
| 29 | $CH_3$ | $CH_3$ | $CH_3$ | H | H | 6—$OCH_3$ | H |
| 30 | H | H | H | H | H | 6—F | H |

EXAMPLES 31 TO 40

Following the procedure of Example 3, but substituting the ketones prepared in Examples 21 to 30 for the ketone used in Example 3, the hydroxy compound shown in Table II below is obtained.

TABLE II

Product (structure with $R^1$, $R^2$, $R^3$, $R^4$, HO, N, =O, X, Y)

| Example No. | R¹ | R² | R³ | R⁴ | X | Y |
|---|---|---|---|---|---|---|
| 31 | $CH_3$ | H | H | H | H | H |
| 32 | $C_2H_5$ | H | H | $C_2H_5$ | 9—Br | H |
| 33 | $CH_3$ | $CH_3$ | $CH_3$ | $CH_3$ | H | 7—$OCH_3$ |
| 34 | $C_3H_7$ | $CH_3$ | $C_3H_7$ | $CH_3$ | 9—$C_6H_5$ | H |
| 35 | H | H | $C_4H_9$ | H | H | 7—$N(CH_3)_2$ |
| 36 | H | H | H | H | H | 8—$OCH_3$ |
| 37 | $C_2H_5$ | $CH_3$ | $C_2H_5$ | $CH_3$ | H | 7—Br |
| 38 | H | H | $CH_3$ | H | H | 8—F |
| 39 | $CH_3$ | $CH_3$ | H | H | 9—$OCH_3$ | H |
| 40 | H | H | H | H | 9—F | H |

EXAMPLES 41 TO 50

Following the procedure of Example 6, but substituting for the 2,3-dihydro-1-hydroxyisoindolo[7,1,2-hij]quinolin5(1H)-one, the compounds prepared in Examples 31 to 40, the product shown below in Table III is obtained. Example No.

TABLE III (structure with Hal¹, H, $R^1$-$R^4$, X, Y, N, =O)

| Example No. | Hal | R¹ | R² | R³ | R⁴ | X | Y |
|---|---|---|---|---|---|---|---|
| 41 | Cl | $CH_3$ | H | H | H | H | H |
| 42 | Br | $C_2H_5$ | H | H | $C_2H_5$ | 9—Br | H |
| 43 | Cl | $CH_3$ | $CH_3$ | $CH_3$ | $CH_3$ | H | 7—$OCH_3$ |
| 44 | Br | $C_3H_7$ | $CH_3$ | $C_3H_7$ | $CH_3$ | 9—$C_6H_5$ | H |
| 45 | Cl | H | H | $C_4H_9$ | H | H | 7—$N(CH_3)_2$ |
| 46 | Cl | H | H | H | H | H | 8—$OCH_3$ |
| 47 | Br | $C_2H_5$ | $CH_3$ | $C_2H_5$ | $CH_3$ | H | 7—Br |
| 48 | Cl | H | H | $CH_3$ | H | H | 8—F |
| 49 | Br | $CH_3$ | $CH_3$ | H | H | 9—$OCH_3$ | H |
| 50 | Cl | H | H | H | H | 9—F | H |

EXAMPLES 51 TO 60

Following the procedure of Example 5, but substituting the 1-hydroxy compound prepared in Example 31 to 40 and the acid, acid anhydride, or acyl or aroyl halide shown in column 1 of Table IV below, the product shown in column 2 is obtained.

TABLE IV (structure with $R^5-C(=O)-O-$, $R^1$-$R^4$, N, =O, X, Y)

| | Acid Anhydride | | | | | | |
|---|---|---|---|---|---|---|---|
| Example No. | or Acid or Aroyl or Acyl Halide | | | | | | |
| | $(R^5-C(=O)-O)_2 C$, $R^5COOH$ or $R^5CHal$ | | | | | | |
| | R⁵ | R¹ | R² | R³ | R⁴ | X | Y |
|---|---|---|---|---|---|---|---|
| 51 | $C_3H_7$ | $CH_3$ | H | H | H | H | H |
| 52 | $C_2H_5$ | $C_2H_5$ | H | H | $C_2H_5$ | 9—Br | H |
| 53 | $C_6H_{13}$ | $CH_3$ | $CH_3$ | $CH_3$ | $CH_3$ | H | 7—$CH_3O$ |
| 54 | $C_7H_{15}$ | $C_3H_7$ | $CH_3$ | $C_3H_7$ | $CH_3$ | 9—$C_6H_5$ | H |
| 55 | $C_6H_5CH_2$ | H | H | $C_4H_9$ | H | H | 7—$(CH_3)_2N$ |
| 56 | $C_5H_9$ | H | H | H | H | H | 8—$OCH_3$ |
| 57 | $CH_3$ | $C_2H_5$ | $CH_3$ | $C_2H_5$ | $CH_3$ | H | 7—Br |
| 58 | $C_6H_5$ | H | H | $CH_3$ | H | H | 8—F |
| 59 | (cyclobutyl) | $CH_3$ | $CH_3$ | H | H | 9—$OCH_3$ | H |
| 60 | (cyclohexyl)$CH_2$ | H | H | H | H | 9—F | H |

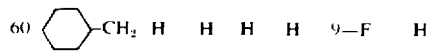
As per Column 1

EXAMPLES 61 TO 70

Following the procedure of Example 7, substituting for the halogen derivative starting material of Example 7, the halogen derivatives prepared in Examples 41 to 50 and employing the alkanols set out in Column 1 of Table V below, the product shown in Column 2 of Table V is obtained.

EXAMPLES 71 TO 80

Following the procedure of Example 8, but substituting the halonaphthostyril starting material prepared in Examples 41 to 50 and the amine or heterocyclic reactant shown in Column 1 of Table VI below, the product shown in Column 2 is obtained.

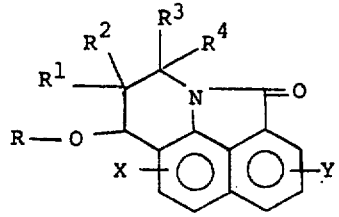

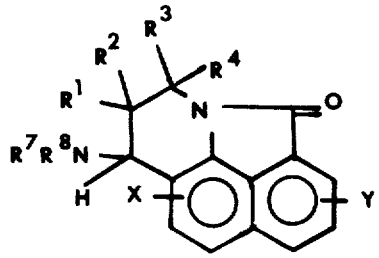

TABLE V Column 2

| Example No. | Column 1 Alkanol ROH R | R | R¹ | R² | R³ | R⁴ | X | Y |
|---|---|---|---|---|---|---|---|---|
| 61 | CH₃ | As per Column 1 | CH₃ | H | H | H | H | H |
| 62 | C₂H₅ | | C₂H₅ | H | H | C₂H₅ | 9—Br | H |
| 63 | C₃H₇ | | CH₃ | CH₃ | CH₃ | CH₃ | H | 7—CH₃O |
| 64 | C₄H₉ | | C₃H₇ | CH₃ | C₃H₇ | CH₃ | 9—C₆H₅ | H |
| 65 | C₅H₁₁ | | H | H | C₄H₉ | H | H | 7—(CH₃)₂N |
| 66 | C₆H₁₃ | | H | H | H | H | H | 8—OCH₃ |
| 67 | C₇H₁₅ | | C₂H₅ | CH₃ | C₂H₅ | CH₃ | H | 7—Br |
| 68 | C₂H₅ | | H | H | CH₃ | H | H | 8—F |
| 69 | CH₃ | | CH₃ | CH₃ | H | H | 9—OCH₃ | H |
| 70 | C₃H₇ | | H | H | H | H | 9—F | H |

TABLE VI

| Example No. | HNR⁷R⁸ | R⁷R⁸N— | R¹ | R² | R³ | R⁴ | X | Y |
|---|---|---|---|---|---|---|---|---|
| 71 | HN⟨ ⟩NH | —N⟨ ⟩NH | CH₃ | H | H | H | H | H |
| 72 | HN⟨ ⟩S | —N⟨ ⟩S | C₂H₅ | H | H | C₂H₅ | 9—Br | H |
| 73 | HN(CH=CH₂)CH₃ | —N(CH=CH₂)CH₃ | CH₃ | CH₃ | CH₃ | CH₃ | H | 7—CH₃O |
| 74 | HN⟨ ⟩N—CH₂CH₂OH | —N⟨ ⟩N—CH₂CH₂OH | C₃H₇ | CH₃ | C₃H₇ | CH₃ | 9—C₆H₅ | H |
| 75 | HN⟨ ⟩⟨CH₃ / CH₃⟩ | —N⟨ ⟩⟨CH₃ / CH₃⟩ | H | H | C₄H₉ | H | H | 7—(CH₃)₂N |
| 76 | HN⟨ ⟩ | —N⟨ ⟩ | H | H | H | H | H | 8—OCH₃ |
| 77 | HN(C₆H₅)CH₃ | —N(C₆H₅)CH₃ | C₂H₅ | CH₃ | C₂H₅ | CH₃ | H | 7—Br |
| 78 | HN⟨ ⟩NCH₃ | —N⟨ ⟩NCH₃ | H | H | CH₃ | H | H | 8—F |
| 79 | HN⟨ ⟩N—CH₂CH₂OAc | —N⟨ ⟩N—CH₂CH₂OAc | CH₃ | CH₃ | H | H | 9—OCH₃ | H |
| 80 | HN⟨ ⟩N—CH₂CH₂CH₂OH | N⟨ ⟩N—CH₂CH₂CH₂OH | H | H | H | H | 9—F | H |

EXAMPLES 81 TO 90

Following the procedure of Example 14, but substituting the 2,3-dihydro-1-hydroxyisoindolo[7,1,2-hij]quinolin-5(1H)-one compounds of Examples 31 to 40 and the nitrile shown in column 1 of Table VII, the product shown in column 2 is obtained.

wherein $n$ is 1 to 4 as per the procedure of Examples 14 and 81 to 90) and the amine shown in column 2, the product shown in column 3 is obtained.

TABLE VII

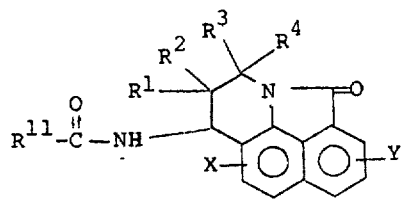

TABLE VIII Column 1

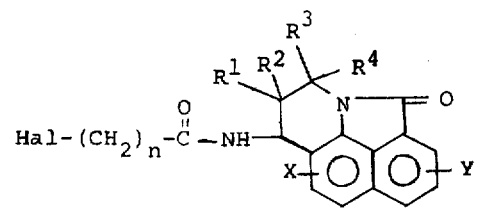

| Example No. | R¹¹CN | | | | | | | |
|---|---|---|---|---|---|---|---|---|
| | $R^{11}$ | $R^{11}$ | $R^1$ | $R^2$ | $R^3$ | $R^4$ | X | Y |
| 81 | C₃H₇ (thiophene) | C₃H₇ (thiophene) | CH₃ | H | H | H | H | H |
| 82 | (thiophene) | (thiophene) | C₂H₅ | H | H | C₂H₅ | 9—Br | H |
| 83 | p—OCH₃—C₆H₄— | p—OCH₃—C₆H₄— | CH₃ | CH₃ | CH₃ | CH₃ | H | 7—CH₃O |
| 84 | p—Cl—C₆H₄— | p—Cl—C₆H₄— | C₃H₇ | 7 | CH₃ | C₃H₇ | CH₃ | 9—C₆H₅ H |
| 85 | p—OH—C₆H₄— | p—OH—C₆H₄— | H | H | C₄H₉ | H | H | 7—(CH₃)₂N |
| 86 | p—(C₂H₅)₂N—C₆H₄— | p—(C₂H₅)₂N—C₆H₄— | H | H | H | H | H | 8—OCH₃ |
| 87 | (pyridyl) | (pyridyl) | C₂H₅ | CH₃ | C₂H₅ | CH₃ | H | 7—Br |
| 88 | ClCH₂CH₂— | ClCH₂CH₂— | H | H | CH₃ | H | H | 8—F |
| 89 | CH₃\NCH₂CH₂ CH₃/ | CH₃\NCH₂CH₂ CH₃/ | CH₃ | CH₃ | H | H | 9—OCH₃ | H |
| 90 | piperidinyl—CH₂CN | piperidinyl—CH₂CN | H | H | H | H | 9—F | H |

EXAMPLES 91 to 100

Following the procedure of Example 18, but substituting as starting materials the halogen-napthostyril derivatives shown in column 1 of Table VIII below (prepared by reacting any of the compounds of Examples 3, 4 and 31-40 with a nitrile of the structure $$\text{Hal—(CH}_2\text{)}_n\text{—CN}$$

Column 3

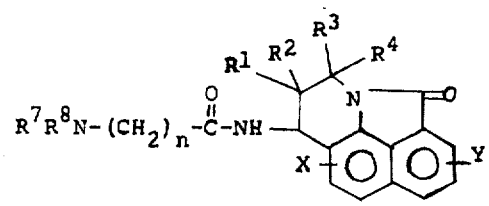

| Ex. No. | Hal | n | $R^1$ | $R^2$ | $R^3$ | $R^4$ | X | Y | HNR⁷R⁸ | R⁷R⁸N | n R¹ R² R³ R⁴ X Y |
|---|---|---|---|---|---|---|---|---|---|---|---|
| 91 | Cl | 1 | CH₃ | H | H | H | H | H | HN(C₆H₅)CH₃ | As per Column 2 | As per Column 1 |
| 92 | Br | 2 | C₂H₅ | H | H | C₂H₅ | 9—Br | H | HN(piperidine) | | |
| 93 | Br | 3 | CH₃ | CH₃ | CH₃ | CH₃ | H | 7—CH₃O | HN(thiomorpholine) | | |
| 94 | Cl | 4 | C₃H₇ | CH₃ | C₃H₇ | CH₃ | 9—C₆H₅ | H | HN(piperidine) | | |
| 95 | I | 2 | H | H | C₄H₉ | H | H | 7(CH₃)₂N | HN(piperazine)(CH₂)₂OH | | |
| 96 | Br | 3 | H | H | H | H | H | 8—OCH₃ | HNHC₆H₅ | | |

TABLE VIII—Continued

| Ex. No. | Hal | n | R¹ | R² | R³ | R⁴ | X | Y | HNR'R" | R'R"N n R¹ R² R³ R⁴ X Y |
|---|---|---|---|---|---|---|---|---|---|---|
| 97 | Br | 2 | C₂H₅ | CH₃ | C₂H₅ | CH₃ | H | 7—Br | HN⌒N—CH₃ | |
| 98 | Cl | 2 | H | H | CH₃ | H | H | 8—F | HN(CH₃)C₂H₅ | |
| 99 | Br | 2 | CH₃ | CH₃ | H | H | 9—OCH₃ | H | HN⌒N—CH₂CH₂Cl | |
| 100 | Cl | 1 | H | H | H | H | 9—F | H | HN⌒ | |

What is claimed is:

1. The compound having the name 1-acrylamido-2,3-dihydroisoindolo[7,1,2-hij]quinolin-5(1H)-one.
2. The compound having the name 1-acetamido-2,3-dihydroisoindolo[7,1,2-hij]quinolin-5(1H)-one.
3. The compound having the name 1-benzamido-2,3-dihydroisoindolo[7,1,2-hij]quinolin-5(1H)-one.
4. The compound having the name 1-(3-bromopropionamido)-2,3-dihydroisoindol[7,1,2-hij]quinolin-5(1H)-one.
5. The compound having the name 2,3-dihydro-1-(3-morpholinopropionamido)-isoindolo[7,1,2-hij]quinolin-5(1H)-one.
6. The compound having the name 2,3-dihydro-1-[3-(1-pyrrolidinyl)propionamido]isoindolo[7,1,2-hij]quinolin-5(1H)-one.
7. The compound having the name 1-[3-(diethylamino)propionamido]-2,3-dihydroisoindolo[7,1,2-hij]quinolin-5(1H)-one, hydrochloride.

* * * * *

UNITED STATES PATENT AND TRADEMARK OFFICE
CERTIFICATE OF CORRECTION

PATENT NO. : 3,910,923
DATED : October 7, 1975
INVENTOR(S) : Seymour D. Levine

It is certified that error appears in the above-identified patent and that said Letters Patent are hereby corrected as shown below:

```
Column 1, line 7, the formula should have I before it.
Column 2, line 25, the formula should have II before it.
Column 2, line 61, the formula should have III before it.
Column 3, line 10, the formula should have IV before it.
Column 3, line 35, the formula should have V before it.
Column 3, line 46, the formula should have VI before it.
Column 3, line 65, the formula should have VII before it.
Column 4, line 6, the formula should have VIII before it.
Column 4, line 22, the formula should have IX before it.
Column 4, line 35, the formula should have X before it.
Column 4, line 45, the formula should have XI before it.
Column 4, line 60, the formula should have XII before it.
Column 6, line 16, the formula should have XIV before it.
Column 6, line 30, the formula should have XV before it.
Column 6, line 41, the formula should have XVI before it.
Column 12, line 56 should read --Table I--.
Column 12, line 57 should read --Column II--.
Column 12, line 66, after the formula should read:
```

$$\underbrace{R^1 \quad R^2 \quad R^3 \quad R^4 \quad X \quad Y}_{\text{As per Column I}}$$

Column 13, line 1, omit "Table I".
Column 15, line 80, there should be a - before the first N in the second column.

Column 19, line 26, "dihydroisoindol" should read --dihydroisoindolo--.

Signed and Sealed this twenty-third Day of March 1976

[SEAL]

Attest:

RUTH C. MASON
Attesting Officer

C. MARSHALL DANN
Commissioner of Patents and Trademarks